United States Patent
Ishida et al.

(10) Patent No.: US 6,803,765 B2
(45) Date of Patent: Oct. 12, 2004

(54) MISFIRE DETECTION SYSTEM FOR INTERNAL COMBUSTION ENGINES

(75) Inventors: Kenichi Ishida, Wako (JP); Toshihiro Okama, Wako (JP); Gakuji Moriya, Wako (JP); Kazuyuki Kubo, Wako (JP); Tomoyuki Kimura, deceased, late of Utsunomiya (JP), by Chiaki Kimura, legal representative (73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1 day.

(21) Appl. No.: 10/022,869

(22) Filed: Dec. 20, 2001

(65) Prior Publication Data

US 2002/0093339 A1 Jul. 18, 2002

(30) Foreign Application Priority Data

Dec. 20, 2000 (JP) .................................... 2000-387040
Oct. 16, 2001 (JP) .................................... 2001-317676

(51) Int. Cl.[7] .............................................. F02P 17/00
(52) U.S. Cl. .................. 324/382; 73/35.01; 123/406.27
(58) Field of Search ............................... 324/378–402; 73/35.01–35.13; 123/406.27

(56) References Cited

U.S. PATENT DOCUMENTS

| | | | | |
|---|---|---|---|---|
| 5,337,716 A | | 8/1994 | Fukui et al. ............ 123/406.14 |
| 5,396,176 A | * | 3/1995 | Ishii et al. .................. 324/388 |
| 5,534,781 A | * | 7/1996 | Lee et al. .................... 324/380 |
| 5,777,216 A | * | 7/1998 | Van Duyne et al. ........ 324/382 |
| 5,778,855 A | | 7/1998 | Czekala et al. ........ 123/406.27 |
| 5,896,842 A | * | 4/1999 | Abusamra .................. 73/35.08 |
| 6,118,276 A | * | 9/2000 | Nakata et al. .............. 324/380 |
| 6,360,587 B1 | * | 3/2002 | Noel ........................ 73/35.08 |
| 6,483,311 B1 | * | 11/2002 | Ketterer et al. ............. 324/388 |

FOREIGN PATENT DOCUMENTS

| JP | A-5-99956 | 4/1993 | ................ 123/644 |
|---|---|---|---|
| JP | 08200196 | 8/1996 | |
| WO | WO 99/31384 | 6/1999 | |

* cited by examiner

*Primary Examiner*—N. Le
*Assistant Examiner*—Timothy J. Dole
(74) *Attorney, Agent, or Firm*—Arent Fox PLLC (57) ABSTRACT

In a system for detecting misfire for an internal combustion engine wherein ionization current that flows following the discharge current is detected and integrated during a period (gate) and occurrence of misfire of the engine is detected based on the integrated value, a processing delay circuit is provided which inputs at least one of the discharge current or the ionization current and based on the inputted current, delays starting of the period by a time point which is not earlier than termination of the discharge current. With this, the system is unaffected by fluctuation in ignition coil discharge period, various kinds of noise and the like, and can therefore ensure accurate misfire detection by preventing erroneous detection owing to such causes.

20 Claims, 11 Drawing Sheets

MISFIRE DETECTION SYSTEM FOR INTERNAL COMBUSTION ENGINES

BACKGROUND OF THE INVENTION

1. Field of the Invention

This invention relates to a system for detecting misfire for internal combustion engines that detects engine misfire based on ionization current occurring upon combustion of an air-fuel mixture, particularly to such a misfire detection system for internal combustion engines that prevents false detection of misfire owing to fluctuation in the discharge period of, or noise produced by, an ignition coil.

2. Description of the Related Art

In a gasoline or other spark-ignition internal combustion engine, a high voltage generated by an ignition coil is applied through an ignition distributor or the like to ignition plugs installed in the individual cylinders. The spark discharge that the high voltages produces across the gap between the ignition plug electrodes ignites the air-fuel mixture, causing combustion. However, when certain causes are present during the engine ignition/combustion stroke, the combustion of the air-fuel mixture does not proceed normally, i.e., misfire occurs.

Causes of misfire fall in two classes, those attributable to the fuel system and those attributable to the ignition system. Misfire attributable to the fuel system is the result of either excessively lean or excessively rich air-fuel mixture. In this case, a spark discharge is produced across the gap of the ignition plug but the air-fuel mixture does not ignite. Misfire attributable to the ignition system is the result of ignition plug smoldering caused by adherence of unburned fuel to the ignition plug or of a problem in the ignition circuit that prevents normal spark discharge (mis-sparking).

When the air-fuel mixture burns normally, the combustion is accompanied by ionization of the air-fuel mixture (more precisely the combustion gas produced by normal burning of the air-fuel mixture) that gives rise to ionization current. When misfire occurs and the air-fuel mixture does not burn, the air-fuel mixture does not ionize and no ionization current arises.

Figure 10:
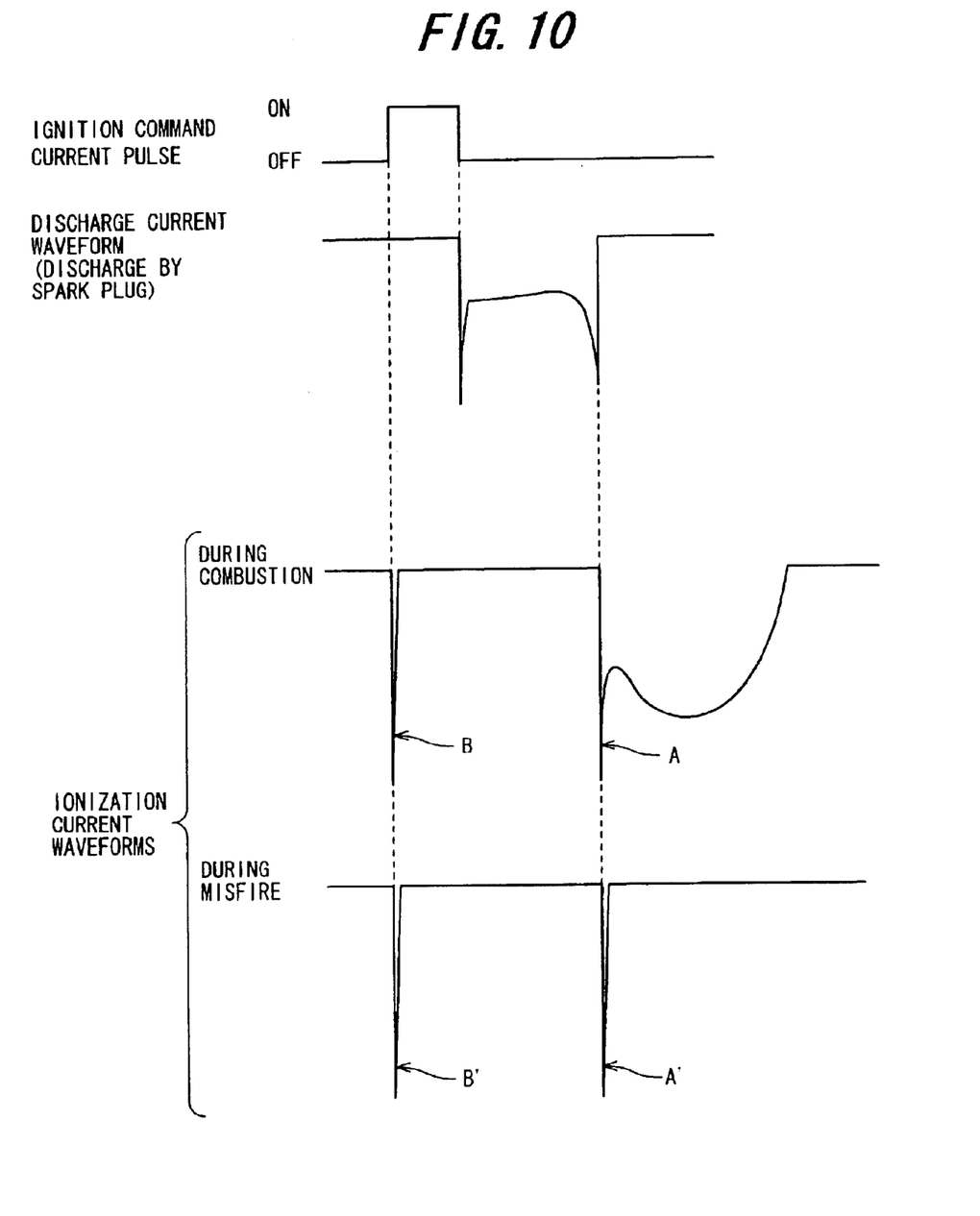
FIG. 10 is a time chart showing the ionization current waveforms during misfire and normal combustion.

FIG. 10 shows the ionization current waveforms during misfire and normal combustion, in which the discharge is produced by a high voltage of negative polarity. As shown, the ionization current waveform during normal combustion, i.e., when ions are produced, spikes instantaneously in the minus direction just after the discharge across the ignition plug electrodes (as seen at A in the drawing), thereafter continues to flow in proportion to the volume or number of ions produced, and eventually returns to a given level. During misfire, i.e., when ions are not produced, the waveform spikes instantaneously in the minus direction just after the end of discharge (as seen at A' in the drawing) and then immediately returns to the given level.

A widely used method of detecting engine misfire has therefore been to detect the ionization current (current waveform) occurring during the combustion stroke using the ignition plug, more exactly the electrodes thereof, as a probe for detecting ionization current, and comparing the detected value with a prescribed value, as taught by, for example, Japanese Laid-open Patent Application No. Hei 5(1993)-99956.

When the ignition command current pulse to the ignition coil is turned ON (i.e., current is supplied), the current waveform spikes in the minus direction during both misfire and normal combustion (as seen at B and B' in the drawing). These spikes appearing at A (A') and B (B') are caused by inductive noise produced by the electromagnetic induction of the ignition coil and some measure is needed to keep them from affecting misfire detection (discrimination).

In this regard, the aforesaid prior art reference (No. Hei 5(1993)-99956) teaches that the adverse effect of inductive noise can be eliminated to detect only the actual ionization current waveform and achieve accurate misfire detection (discrimination) by not performing current waveform detection (by masking) for a prescribed period after the ignition command current pulse to the ignition coil is turned ON and current is supplied (specifically, during the time from the rise of the current waveform indicated at B to the fall of the current waveform indicated at A).

Figure 11:
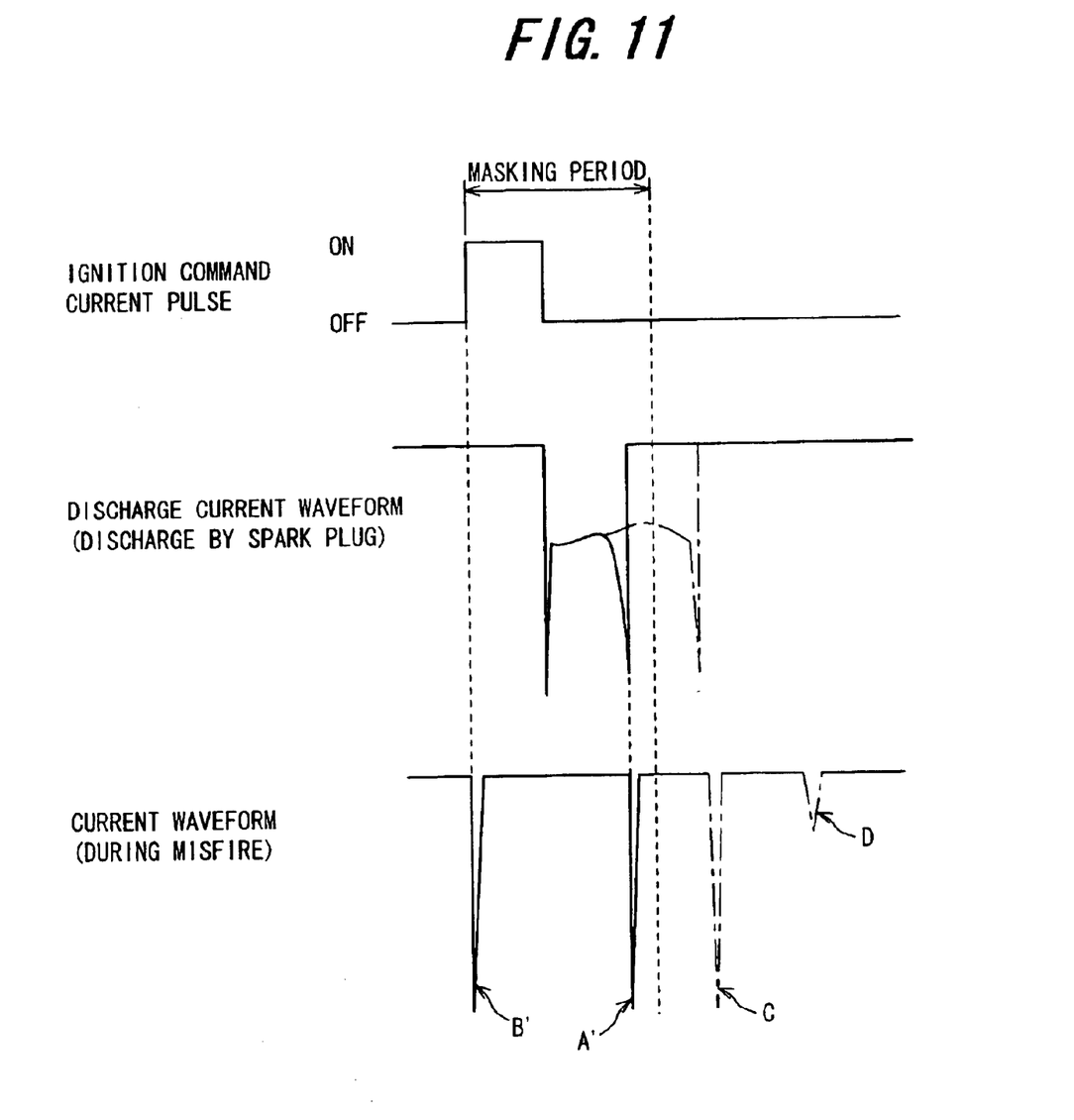
FIG. 11 is a view, similar to FIG. 10, but showing a problem in the prior art misfire detection system.

This known technique cannot, however, totally eliminate the influence of inductive noise when the ignition coil discharge period fluctuates, such as shown by the alternate long and short dashed lines in FIG. 11. This is because the method taught by this prior art reference conducts masking over a prescribed period following the time point of turn-on of the ignition command current pulse to the ignition coil (the charging start point) as the start of the masking period. When the discharge period of the ignition coil is prolonged, therefore, an inductive noise-induced rise in the current waveform occurring after the masking period has passed (as indicated at C in the drawing) is erroneously detected and affects the detection (discrimination) of misfire.

Moreover, since current is constantly detected at times other than during the masking period, currents produced by various kinds of noise (such as indicated at D in the drawing) are also detected and have a similar adverse effect on misfire detection (discrimination). A situation may arise, therefore, in which the current waveforms indicated at C and D in the drawing are erroneously discriminated as the result of ionization current, even though a misfire has occurred and no ionization current is actually present.

SUMMARY OF THE INVENTION

The present invention was accomplished to overcome the foregoing problems and has as an object to provide a misfire detection system for internal combustion engines that is unaffected by fluctuation in ignition coil discharge period, various kinds of noise and the like, and can therefore ensure accurate misfire detection by preventing erroneous detection (erroneous discrimination) owing to such causes.

For overcoming the foregoing problem, this invention provides a system for detecting misfire for an internal combustion engine having an ignition plug, installed to face into a combustion chamber of a cylinder of the engine and connected to an ignition coil, which produces spark discharge when supplied with discharge current from the ignition coil to ignite air-fuel mixture in the combustion chamber; including: a current detection circuit which detects ionization current, that flows following the discharge current, during a period; a misfire detector which detects occurrence of misfire of the engine based on the detected current; and a processing delay circuit which inputs at least one of the discharge current and the ionization current and based on the inputted current, delays starting of the period by a time point which is not earlier than termination of the discharge current.

BRIEF DESCRIPTION OF THE DRAWINGS

This and other objects and advantages of the invention will be made more apparent with reference to the following description and drawings, in which.

DETAILED DESCRIPTION OF THE PREFERRED EMBODIMENTS

A misfire detection system for internal combustion engines according to an embodiment of the present invention will now be explained with reference to the attached drawings.

Figure 1:
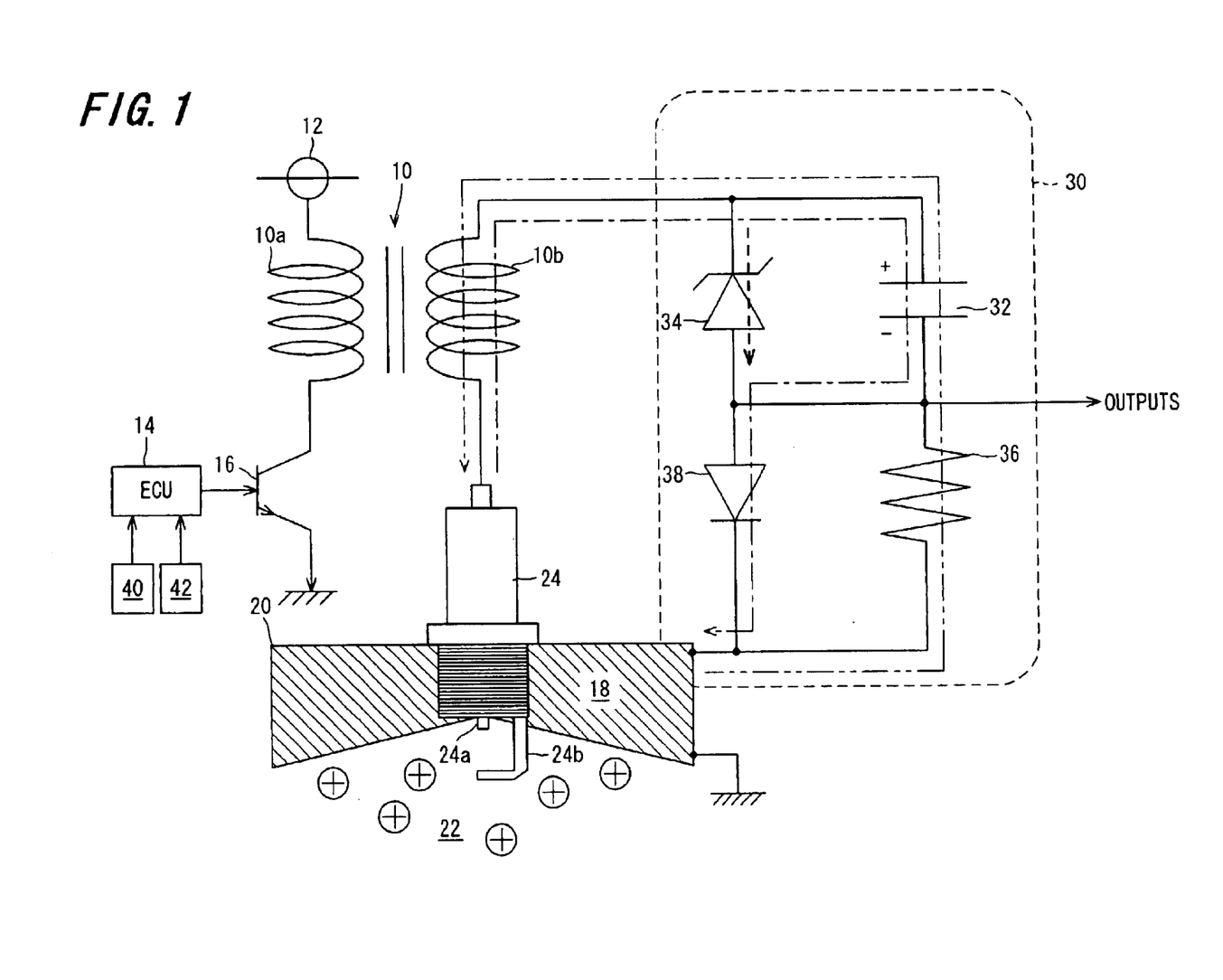
FIG. 1 is an explanatory circuit diagram showing an ignition circuit for producing a spark in an ignition plug and an ionization current detector for detecting ionization current produced during combustion, of a misfire detection system for internal combustion engines according to an embodiment of the present invention.

FIG. 1 is a partial circuit diagram of the engine misfire detection system according to the embodiment, showing an ignition circuit for producing a spark in an ignition plug and an ionization current detector for detecting ionization current produced during combustion.

As illustrated, the engine misfire detection system comprises an ignition coil 10 whose primary side (low-voltage side) coil 10a is connected at one end to an electric power source (onboard battery) 12 and at the other to ground through a power transistor 16 that is switched by an ignition signal from an ECU (electronic control unit) 14.

One end of the secondary side (high-voltage side) coil 10b of the ignition coil 10 is connected to the center electrode 24a of an ignition plug 24 installed to face into a combustion chamber 22 of each cylinder 20 (only one indicated as the corresponding part of a cylinder head 18) of a multi-cylinder internal combustion engine (only illustrated by the cylinder 20 etc.). The ground (outer) electrode 24b of the ignition plug 24 is grounded through the cylinder head 18. Following the completion of discharge, the ignition plug 24 also functions as a probe for detecting ionization current. This will be explained in detail later.

The other end of the secondary coil 10b of the ignition coil 10 is connected to an ionization current detector (current detection circuit) 30. The ionization current detector 30 comprises a parallel connection of an ionization current detection capacitor 32 charged in the illustrated polarity by discharge current and a Zener diode 34 that regulates the charging voltage of the ionization current detection capacitor 32, a detection resistor 36 through which the ionization current detection capacitor 32 is connected to ground, and a diode 38 for preventing reverse current flow through which the Zener diode 34 is connected to ground.

The ECU 14 comprises a microcomputer. It is inputted with the outputs of a group of sensors, including a crank angle sensor 40 that is installed near the crankshaft or camshaft (neither shown) of the engine and outputs a signal representing the TDC position and subdivided crank angles thereof of the individual cylinders, a manifold absolute pressure sensor 42 that outputs a signal representing the absolute pressure (PBA) in the air intake pipe, and other sensors not shown in the drawing.

The operation of the illustrated arrangement will now be explained. The flow of current from the power source 12 through the primary coil 10a is switched (turned ON and OFF) by the power transistor 16 in response to the ignition signal (ignition command current pulse) from the ECU 14.

When the ignition command current pulse is made from ON to OFF, i.e., when the current flow through the primary coil 10a is stopped by switching of the power transistor 16 from ON to OFF, a high voltage of negative polarity is concurrently produced in the secondary coil 10b. Discharge current therefore flows as indicated by the alternate long and short dashed line in FIG. 1. Specifically, current flowing through the path of the ignition plug 24→secondary coil 10b→ionization current detection capacitor 32 (or Zener diode 34)→diode 38 produces a spark discharge across the gap of the ignition plug 24 (between the center electrode 24a and ground electrode 24b) that ignites the air-fuel mixture and causes combustion. At the same time, the ionization current detection capacitor 32 is charged in the polarity shown in the drawing. When charged, the ionization current detection capacitor 32 functions as a current detection power source providing a bias voltage for detecting ionization current and leak current.

During the combustion of the air-fuel mixture set off by the spark discharge at the ignition plug 24, the air-fuel mixture (more precisely the combustion gas produced by normal burning of the air-fuel mixture) ionizes. The ions produced migrate owing to the effect of the bias voltage of the ionization current detection capacitor 32 and their resulting presence between the electrodes of the ignition plug 24 lowers the electrical resistance between the electrodes. As a result, ionization current flows through the path of the ionization current detection capacitor 32→secondary coil 10b→ignition plug 24, as indicated by the alternate long and two short dashed line in FIG. 1. The ionization current occurring at this time changes the voltage drop across the detection resistor 36. The ionization current detector 30 outputs this voltage change, i.e., the ionization current waveform, to a waveform converter explained later.

The ECU 14 calculates an ignition timing based on the inputted values from the crank angle sensor 40, manifold absolute pressure sensor 42 and other sensors, and produces an ignition command current pulse in such a way that ignition occurs at the calculated timing. It also discriminates whether or not the engine is in a misfire state (conducts misfire detection) based on an integral value (voltage) outputted by an integrator explained later.

Figure 2:
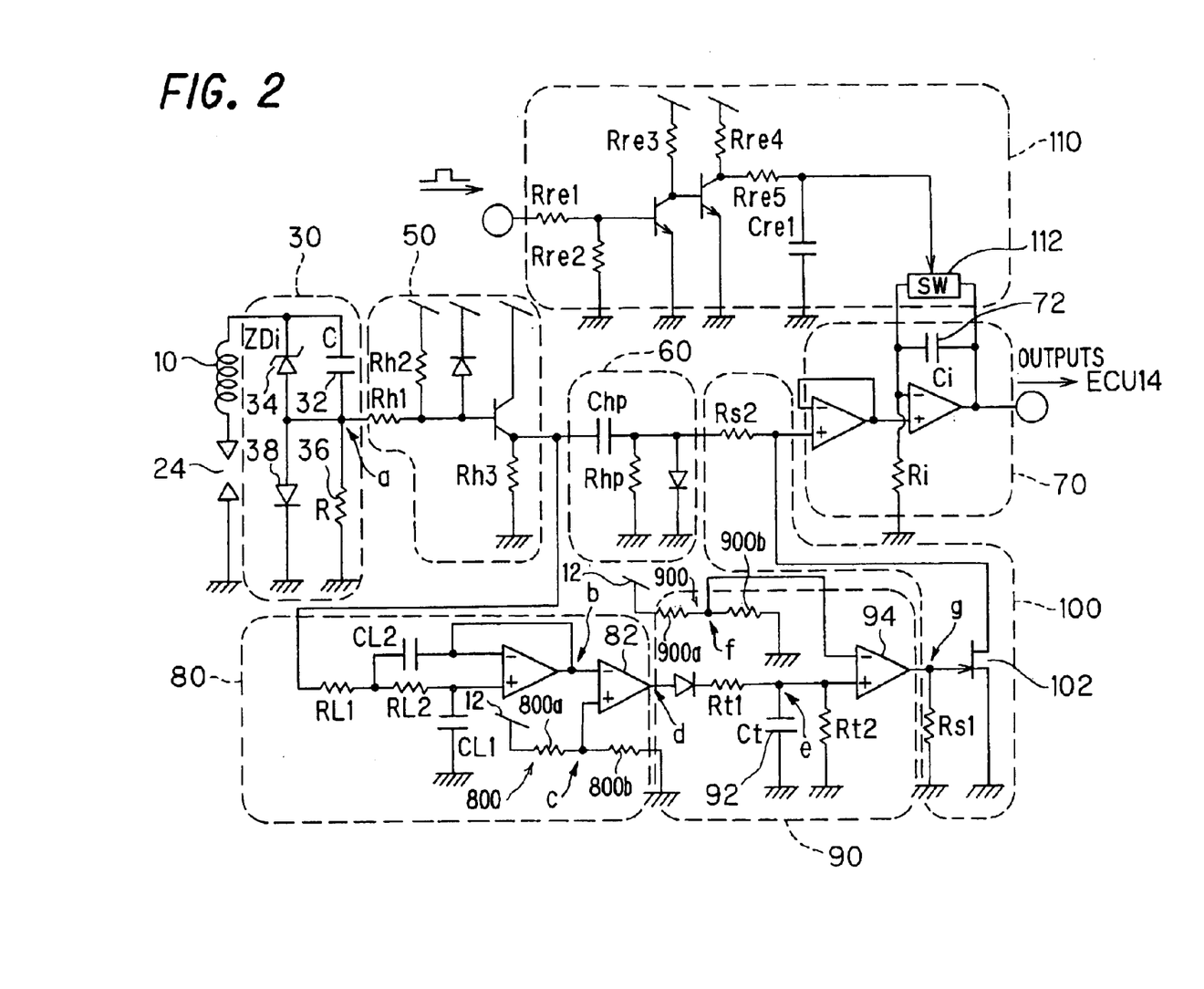
FIG. 2 is a circuit diagram schematically showing the overall configuration of the misfire detection system for internal combustion engines according to the embodiment.

FIG. 2 is a circuit diagram schematically showing the overall configuration of the misfire detection system for internal combustion engines according to this embodiment of the present invention. Part of the ignition circuit is omitted from FIG. 2 for convenience of illustration.

Before going into an explanation of FIG. 2, however, the operation of the circuit will, for ease of understanding, be generally explained with reference to FIG. 3.

Figure 3:
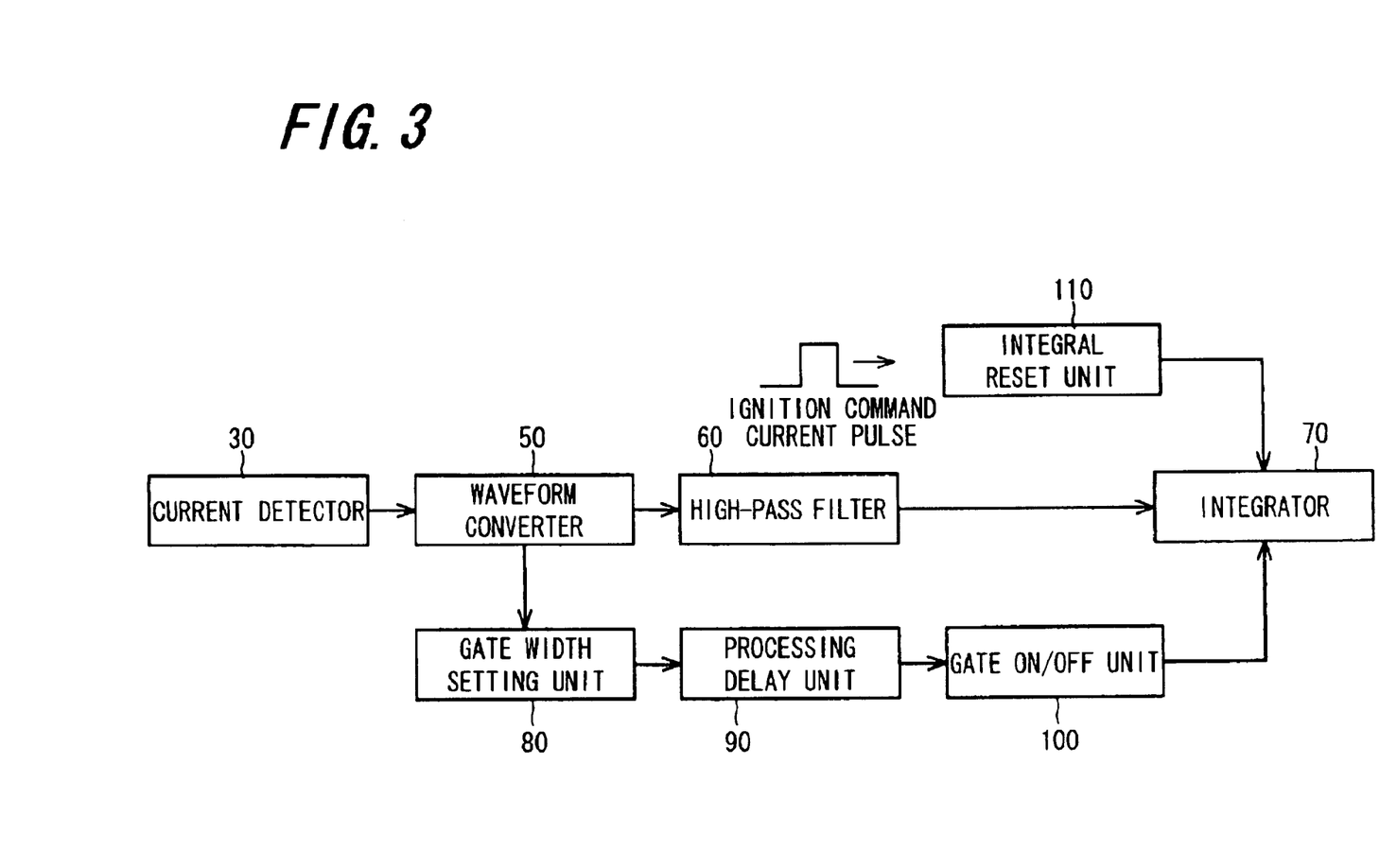
FIG. 3 is a block diagram showing the circuits illustrated in FIG. 2 in block form.

FIG. 3 is a block diagram representing the circuit of FIG. 2 in block form.

The ionization current waveform detected in the current detector 30 is forwarded to the waveform converter (now assigned with reference numeral 50) that subjects the waveform to polarity-reversal and voltage-reduction processing.

The ionization current waveform subjected to polarity-reversal and voltage-reduction in the waveform converter 50 is passed through a high-pass filter 60 to remove its low-frequency components and then input to an integrator 70 that effects integration processing to determine the time integral of the ionization current. As a result, there obtained an output signal proportional to the time integral.

The ionization current waveform after polarity reversal and voltage reduction in the waveform converter 50 is also sent to a gate width setting unit 80. The gate width setting unit 80 passes the ionization current waveform through an internal low-pass filter to attenuate frequency band output (noise) other than the ionization current. It also sets or determining the width of a gate (ionization current integration period) in proportion to the period of ionization current occurrence, thereby setting the period of integration by the integrator 70.

A processing delay unit (circuit) 90 delays (masks) the integration start time set by the gate width setting unit 80 to a time point that enables avoidance of the effect of inductive noise. A gate on/off unit 100 operates to turn the input of the ionization current waveform to the integrator 70 ON and OFF in accordance with the integration period and integration start time set or determined by the gate width setting unit 80 and processing delay unit 90. The integration by the integrator 70 is thus limited to a desired period (gate), i.e., only the period during which ionization current occurs.

The integral value calculated over the integration period (the gate width) by the integrator 70 is reset by an integral reset unit 110 when the next ignition command current pulse is sent to the ignition coil.

Thus, in the system of the present embodiment of the invention, the integration period, which defines the ionization current detection period, is set or determined in accordance with the ionization current occurrence period and, in addition, its start time is delayed (masked) to a time point that makes the detection safe from the influence of inductive noise.

The foregoing configuration and its operation will now be explained in detail with reference to FIG. 2.

First, as pointed out in the foregoing, the ionization current detector 30 detects the ionization current waveform (more precisely the voltage waveform) produced by air-fuel mixture combustion and the detected ionization current waveform is outputted to the waveform converter 50.

Figure 4:
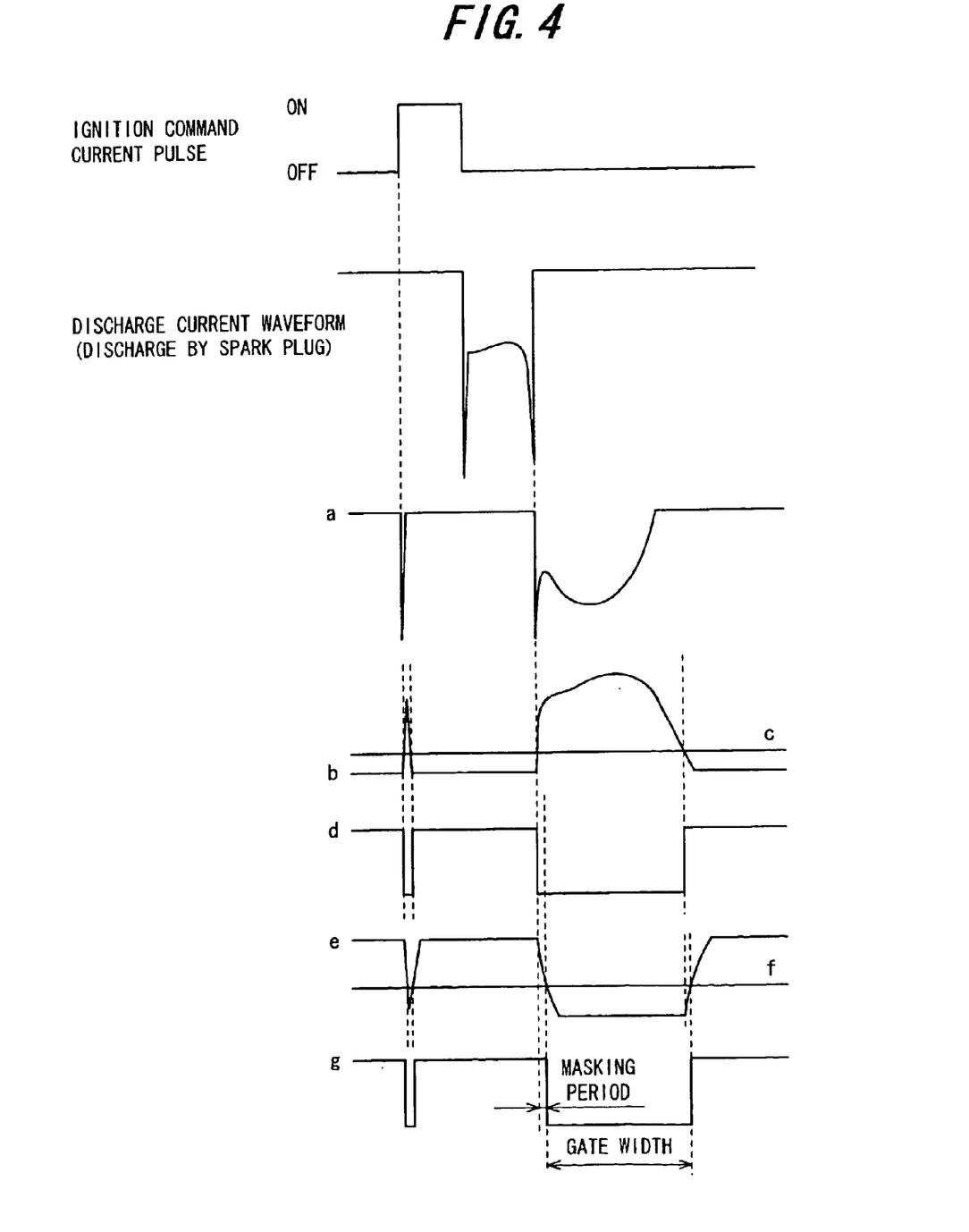
FIG. 4 is a time charts showing outputs (detected current waveforms and pulses) in the engine misfire detection system during normal combustion.
Figure 5:
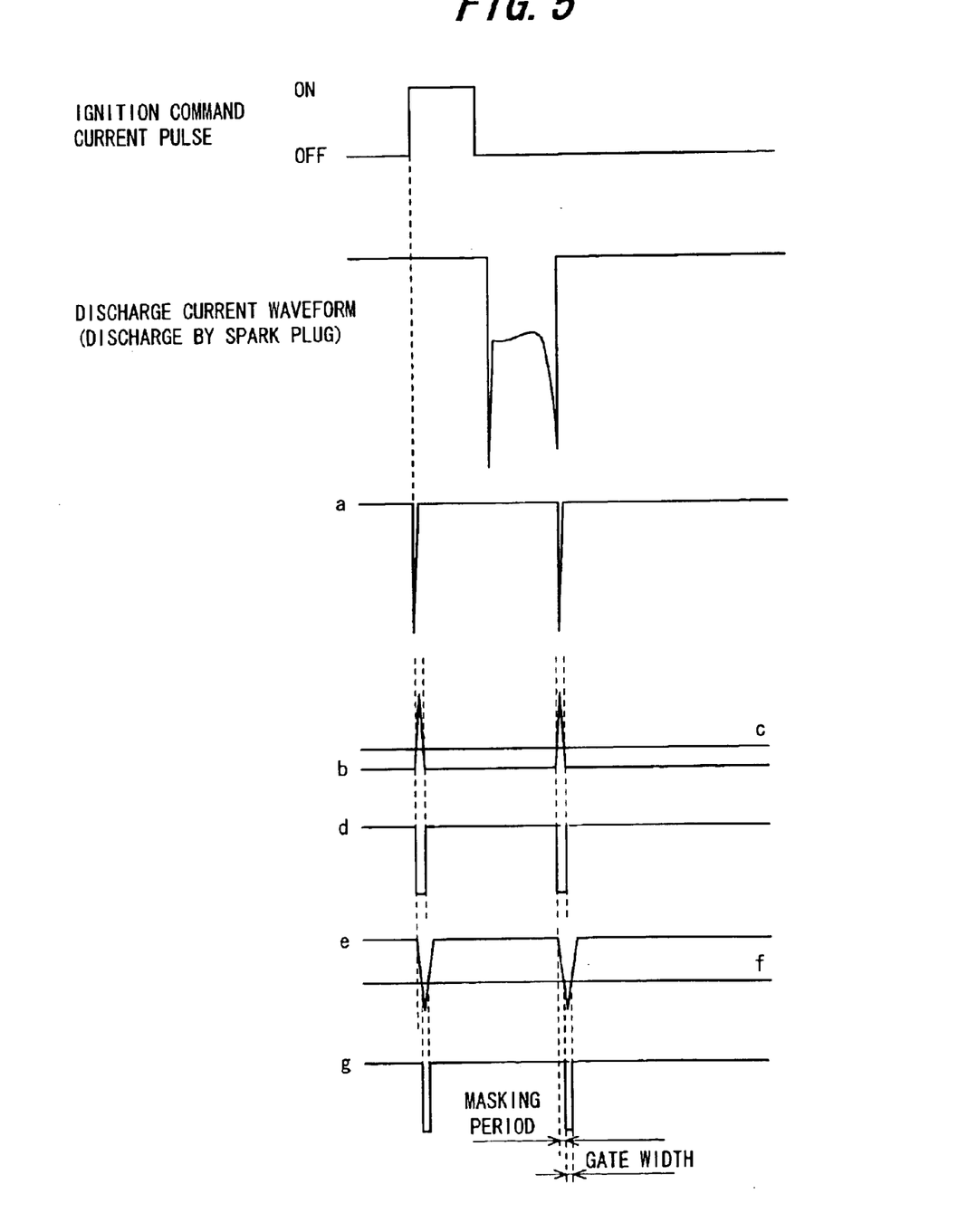
FIG. 5 is a time charts showing outputs (detected current waveforms and pulses) in the engine misfire detection system during misfire.

FIGS. 4 and 5 are time charts showing outputs (detected current waveforms and pulses) in the engine misfire detection system of the present embodiment. The time chart of FIG. 4 is for the case of normal combustion. One for the case of misfire is shown in FIG. 5. The symbols a, b, c . . . , g in FIGS. 4 and 5 indicate the outputs at a, b, c . . . , g in FIG. 2.

As shown in FIGS. 4 and 5, the ionization current waveform detected by the ionization current detector 30 (specifically the detection resistor 36), i.e., the current waveform at the point designated a in FIG. 2, spikes instantaneously in the minus direction owing to inductive noise just after the discharge across the gap of the ignition plug 24, current thereafter continues to flow in proportion to the volume or number of ions produced, and eventually returns to a given level. During misfire, i.e., when ions are not produced, the waveform spikes instantaneously just after the end of discharge and then immediately returns to the given level.

The ionization current waveform detected in the ionization current detector 30 is forwarded to the waveform converter 50, where it is reversed in polarity and lowered in voltage, and is then sent through the high-pass filter 60 to the integrator 70.

The ionization current waveform after polarity reversal and voltage reduction in the waveform converter 50 is also sent to the gate width setting unit 80. The gate width setting unit 80 passes the ionization current waveform through an internal low-pass filter to attenuate frequency band output other than the ionization current, as mentioned earlier. The filtered output, specifically the current waveform at the point designated b in FIG. 2 (shown at b in FIGS. 4 and 5) is inputted to the negative (inverting) terminal of a gate width setting comparator 82.

The positive (non-inverting) terminal of the gate width setting comparator 82 is connected to a reference voltage supply circuit 800 (comprising two resistors 800a, 800b provided between the power source 12 and the ground) at a position divided by the two resistors and is constantly inputted with a reference voltage or value (shown at c in FIGS. 4 and 5). The negative (inverting) terminal of the comparator 82 is connected to the output from the waveform converter 50 through capacitors CL1, CL2 and a comparator, as illustrated. The two voltages are compared and when the output from the low-pass filter (ionization current waveform) is higher, the output of the gate width setting comparator 82, i.e., the output pulse at the point designated d in FIG. 2 (shown at d in FIGS. 4 and 5) is made Low. In other words, the output pulse of the gate width setting comparator 82 is made High when the reference voltage is higher.

The Low pulse output period of the gate width setting comparator 82 is the gate width (which corresponds to the period of the integration performed in the integrator 70 and thus to the ionization current detection period for detecting misfire). Since the gate width setting unit 80 thus sets the gate width based on the ionization current waveform (the period of ionization current occurrence), currents that arise outside the period of ionization current occurrence owing to various kinds of noise and other causes are not detected and are therefore prevented from having an effect on the misfire detection. As a result, false misfire detection (erroneous discrimination) owing to such currents is prevented and accurate misfire detection is ensured.

The output pulse of the gate width setting unit 80 is sent to the processing delay unit 90. The processing delay unit 90 delays the integration start time, i.e., sets or determines the masking period at the beginning of the gate width.

Specifically, the fall time point of the output pulse from the gate width setting unit 80 (at the time of Low pulse output) is delayed by the charging/discharging of a processing delay capacitor 92. In other words, the High period of the output pulse is extended to obtain a current waveform at the point designated e in FIG. 2 like that shown at e in FIGS. 4 and 5.

The so-obtained current waveform is inputted to the positive (non-inverting) terminal of a processing delay comparator 94. The negative (inverting) terminal of the comparator 94 is connected to reference voltage supply circuit 900 (comprising two resistors 900a, 900b provided between the power source 12 and the ground) at a position divided by the two resistors and is inputted with a reference voltage or value (shown at f in FIGS. 4 and 5). The two voltages are compared and when the current waveform at e in FIG. 2 is lower than the reference voltage, the output of the processing delay comparator 94, i.e., the output pulse g in FIG. 2 (shown at g in FIGS. 4 and 5), is made Low.

As can be seen from FIGS. 4 and 5, the fall time point of the output pulse finally obtained from the processing delay unit 90 is delayed by a certain time from the start of ionization current occurrence. In other words, it can be said that the fall time point of the output pulse is delayed by a certain time from the termination of current discharge, since the ionization current occurrence follows immediately after the termination of current discharge. Thus, the period (gate) is delayed by a time point which is not earlier than the termination of the discharge current. The input to the integrator 70 of the ionization current waveform outputted from the high-pass filter 60 is turned ON and OFF by ON/OFF operating a FET (field effect transistor) 102 of a gate on/off unit 100 based on this output pulse whose fall time point has been delayed.

The integrator 70 time-integrates the ionization current input thereto in the foregoing manner and sends an output signal proportional to the time integral, namely, the voltage value of an integration capacitor 72, to the ECU 14. The ECU 14 compares the voltage value with a certain preset value to discriminate whether or not the engine is in a misfire state (conducts misfire detection).

The delay time varies with the capacity (indicative of time constant) of the processing delay capacitor 92 and the magnitude of the reference voltage indicated at f in FIGS. 4 and 5. Therefore, by appropriately setting or determining one or both of these values, the length of the delay time can be set to one that eliminates the influence of inductive noise. Since this makes it possible reliably mask the region of the ionization current waveform outputted from the high-pass filter 60 that corresponds to the period of inductive noise occurrence, the inductive noise can be prevented from having an adverse effect on the misfire detection. As a result, false misfire detection (discrimination) caused by inductive noise can be prevented to achieve still more accurate misfire detection.

The voltage of the integration capacitor 72 is reset when the next ignition command current pulse is sent to the ignition coil as mentioned above, by turning on a switch 112 of the integral reset unit 110 so as to discharge the integration capacitor 72.

In the misfire detection system for internal combustion engines according to the present embodiment of the invention, the starting of the gate is delayed by a time which is not earlier than the termination of the discharge current and the gate width is set based on the waveform of the ionization current (period of ionization current occurrence, i.e., the termination of current discharge) so as to avoid detection of currents produced by various kinds of noise occurring outside the period of ionization current occurrence. As such noise therefore does not affect the misfire detection, false misfire detection (discrimination) can be avoided to realize accurate misfire detection.

Figure 6:
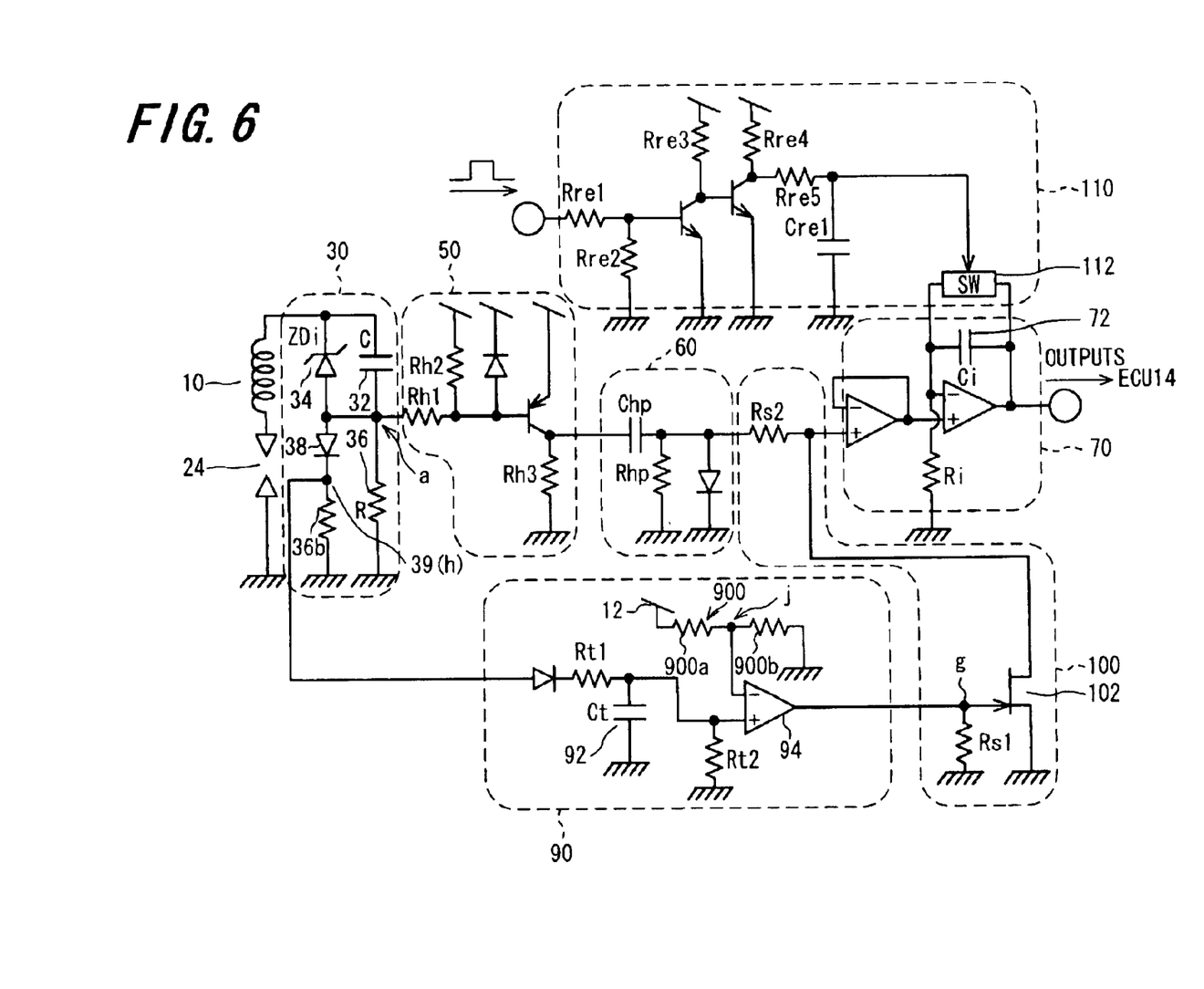
FIG. 6 is a view, similar to FIG. 2, but showing the configuration of a misfire detection system for internal combustion engines according to a second embodiment of the present invention.

FIG. 6 is a view, similar to FIG. 2, but showing the configuration of a misfire detection system for internal combustion engines according to a second embodiment of the present invention.

Figure 7:
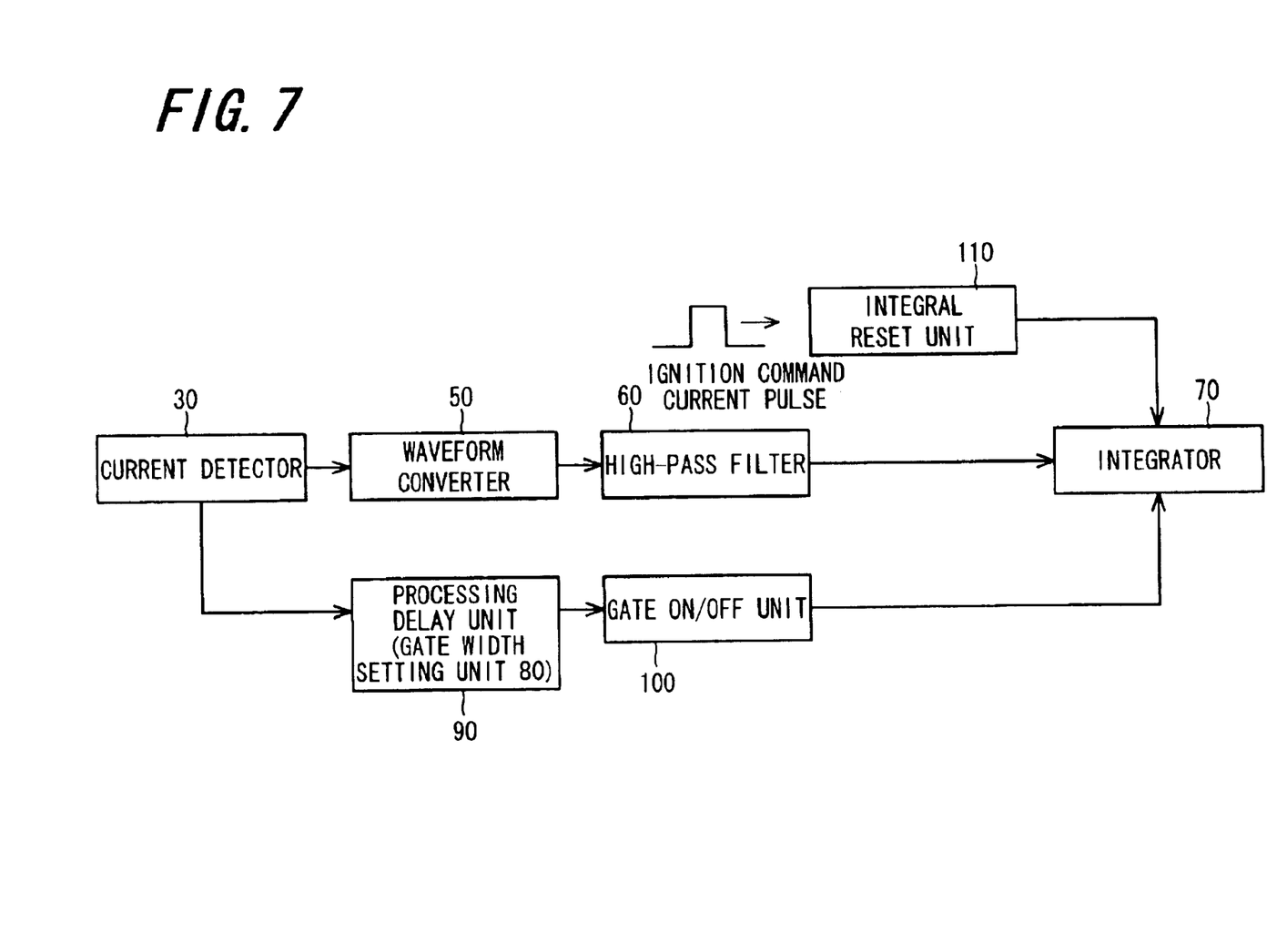
FIG. 7 is a view, similar to FIG. 3, but showing the configuration of the misfire detection system for internal combustion engines according to the second embodiment.
Figure 8:
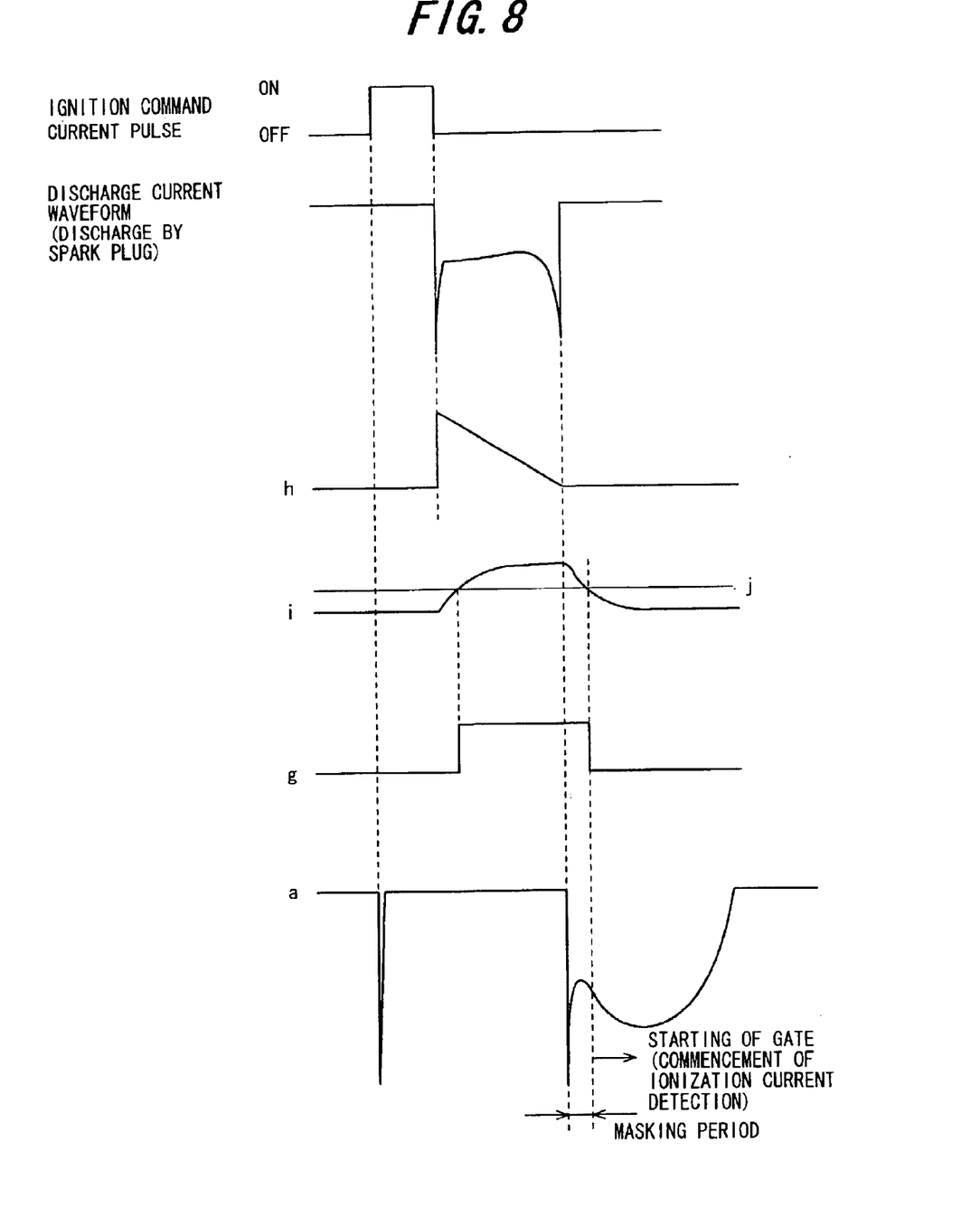
FIG. 8 is a view, similar to FIG. 4, but showing the configuration of the misfire detection system for internal combustion engines according to the second embodiment.
Figure 9:
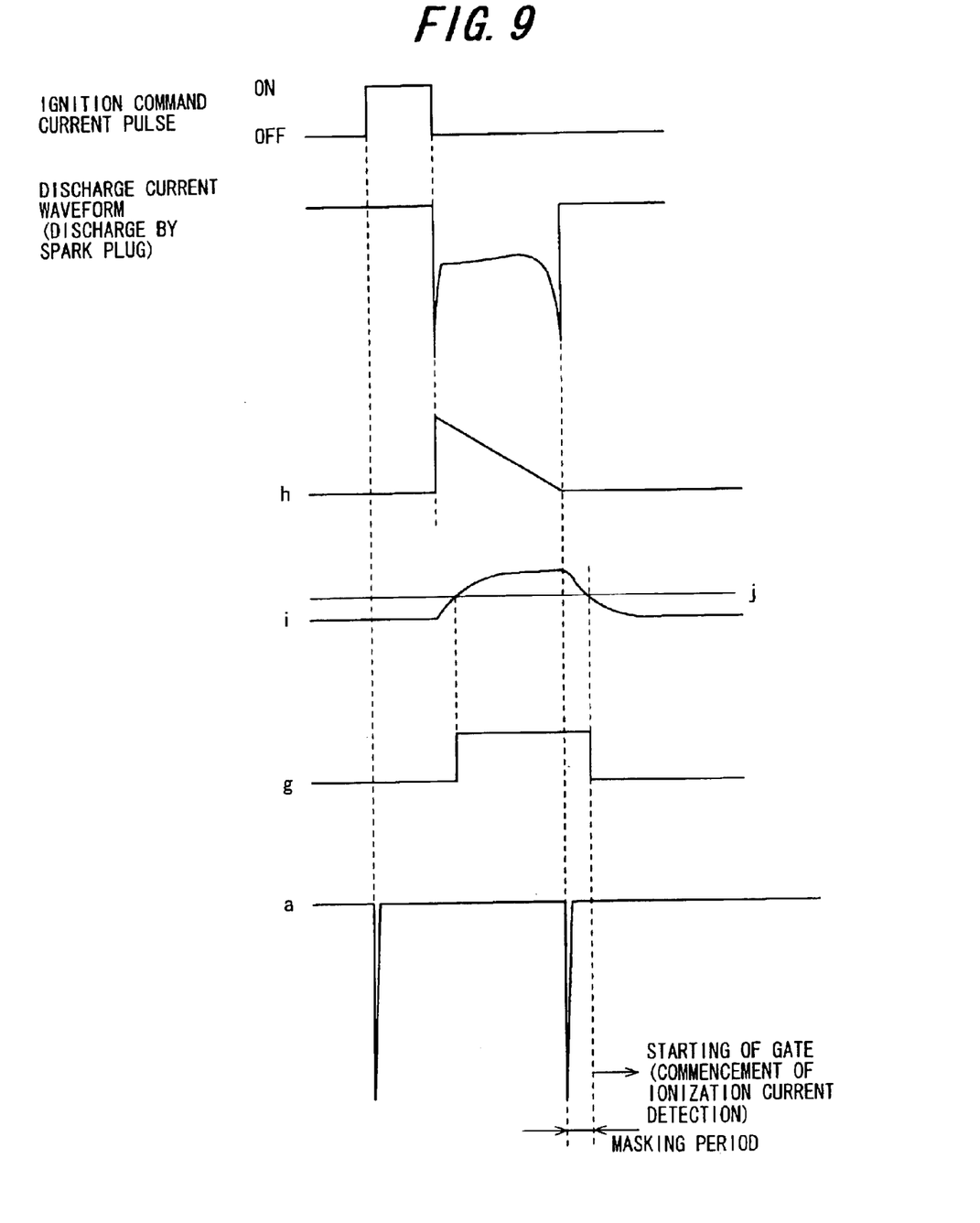
FIG. 9 is a view, similar to FIG. 5, but showing the configuration of the misfire detection system for internal combustion engines according to the second embodiment.

Explaining the system according to the second embodiment with focus on the differences from that of the first embodiment with references to FIGS. 7 to 9 (which are similar to FIGS. 3 to 5 in the first embodiment), the system is configured such that the gate width setting unit 80 is incorporated into the processing delay unit 90 and the current detector 30 is modified to output the discharge current (produced in the secondary coil 10b when the current flow through the primary coil 10a is discontinued) to the processing delay unit 90 in such a way that the integration start time is delayed (masked) to a time point from the termination of the discharge current, more precisely by a time point, which is not earlier than the termination of the discharge current that enables avoidance of the effect of inductive noise.

Explaining this with reference to FIG. 6, the diode 38 is grounded through a secondary detection resistor 36b, and at a point 39 therebetween, the line is branched in such a manner that the voltage at the junction is outputted and is sent, via the processing delay capacitor 92, to the positive (non-inverting) terminal of the processing delay comparator 94 of the processing delay unit 90. The negative (inverting) terminal of the comparator 94 is connected to the reference voltage supply circuit 900 at a position divided by the two resistors 900a, 900b and is constantly inputted with the reference voltage.

Since the input to the positive terminal of the comparator 94 is connected to the processing delay capacitor 92, the fall time point of the discharge current waveform (at the time of Low pulse output) can be delayed by the charging/discharging of the processing delay capacitor 92. In other words, the High period of the output pulse is extended to obtain a current waveform at the point designated g in FIG. 7 like that shown at g in FIGS. 8 and 9, beyond the termination of the discharge current at the point 39 as shown at h in the figures.

The processing delay capacitor 92 and the reference voltage supply circuit 900 now constitutes the processing delay unit 90.

Specifically, the discharge current waveform detected at the point (junction) 39 is inputted to the positive (non-inverting terminal) of the processing delay comparator 92 through a diode and a resistor Rt1. The current waveform at the point designated i in FIG. 7 is shown at i in FIGS. 8 and 9, and compared with the reference voltage input to the negative (inverting) terminal of the comparator 94 is supplied with the reference voltage (shown at j in FIGS. 6, 8 and 9). When the output from the discharge current waveform is lower, the output of the comparator 94, i.e., the output pulse at the point designated g in FIG. 6 is made Low, whose pulse output period (pulse) defines the gate width (which corresponds to the period of the integration performed in the integrator 70 and thus to the ionization current detection period for detecting misfire.

In the same manner as the first embodiment, the delay time varies with the capacity (indicative of time constant) of the processing delay capacitor 92 and the magnitude of the reference voltage indicated at j in FIGS. 8 and 9. Therefore, by appropriately setting or determining one or both of these values, the length of the delay time can be set to one that eliminates the influence of inductive noise. Since this makes it possible reliably mask the region of the ionization current waveform output from the high-pass filter 60 that corresponds to the period of inductive noise occurrence, the inductive noise can be prevented from having an adverse effect on the misfire detection. As a result, false misfire detection (discrimination) caused by inductive noise can be prevented to achieve still more accurate misfire detection.

It should be noted that, in the system in the second embodiment, since the gate on/off unit 100 only determines the opening of the gate and the gate is left open until it is reset by the next ignition command current pulse, the system cannot exclude the detection of various kinds of noise (such as indicated at D in FIG. 11) occurring at times other than during the masking period. Except for the above, the rest of the configuration including the misfire detection by the integrated ionization current is the same as that of the first embodiment.

With this, currents that arise outside the period of ionization current occurrence owing to various kinds of noise and other causes are not detected and are therefore prevented from having an effect on the misfire detection. As a result, false misfire detection (erroneous discrimination) owing to such currents is prevented and accurate misfire detection is ensured.

The first and second embodiments are thus configured to have a system for detecting misfire for an internal combustion engine having an ignition plug (24), installed to face into a combustion chamber (22) of the cylinder (20) of the engine and connected to an ignition coil (10), which produces spark discharge when supplied with discharge current from the ignition coil to ignite air-fuel mixture in the combustion chamber; including: a current detection circuit (current detector 30) which detects ionization current, that flows following the discharge current, during a period (gate); and a misfire detector (ECU 14) which detects occurrence of misfire of the engine based on the detected circuit. A characterizing feature is that the system includes: a processing delay circuit (ECU 14, unit 90) which inputs at least one of the discharge current and the ionization current and based on the inputted current, delays starting of the period by a time point which is not earlier than termination of the discharge current.

In the system, the processing delay circuit includes; a comparator (94) which inputs the current to compares with a reference value (voltage) and produces an output indicative of at least starting of the period, and a capacitor (92) provided before the comparator which delays inputting of the current to the comparator such that the starting of the period is delayed by the time.

In the system, the processing delay circuit includes; a comparator (94) which inputs the current to compares with a reference value (voltage) and produces an output indicative of at least starting of the period, and a reference value (voltage) supply circuit (800, 900) which varies the reference value (voltage) to delay producing of the output of the comparator such that the starting of the period is delayed by the time.

The system further including a comparator (82) which inputs the ionization current to be compared with a reference value (voltage) and produces the output indicative of the starting and ending of the period (gate).

In the system, the comparator (94) inputs the discharge current and produces the output indicative of the starting of the period (gate).

In the system, the current detection circuit, more precisely the integrator 70 includes an integration capacitor (72) to be charged by the ionization current, and the misfire detector detects the occurrence of misfire of the engine based on an output of the integration capacitor.

Since the engine misfire detection system according the present invention is configured to delay the start of the integration period by a prescribed period (the masking period) from the start of the period of ionization current occurrence, waveforms during the time of inductive noise occurrence can be reliably masked and prevented from exerting any adverse effect. False misfire detection caused by such a waveform can therefore be prevented to enable still more accurate detection of misfire.

The entire disclosure of Japanese Patent Application No. 2000-387040 filed on Dec. 20, 2000, and No. 2001-317676 filed on Oct. 16, 2001, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for detecting misfire for an internal combustion engine having an ignition plug, installed to face into a combustion chamber of a cylinder of the engine and connected to an ignition coil, which produces spark discharge when supplied with discharge current from the ignition coil to ignite air-fuel mixture in the combustion chamber; comprising:

a current detection circuit which detects ionization current, that flows following the discharge current, during a period;

a misfire detector which detects occurrence of misfire of the engine based on the detected current; and a processing delay circuit which inputs at least one of the discharge current and the ionization current and based on the inputted current, delays starting of the period by a time point which is not earlier than termination of the discharge current.

2. A system according to claim 1, wherein the processing delay circuit includes;

a comparator which inputs the current to compares with a reference value and produces an output indicative of at least starting of the period, and a capacitor provided before the comparator which delays inputting of the current to the comparator such that the starting of the period is delayed by the time.

3. A system according to claim 2, wherein the comparator inputs the ionization current and produces the output indicative of the starting and ending of the period.

4. A system according to claim 2, wherein the comparator inputs the discharge current and produces the output indicative of the starting of the period.

5. A system according to claim 1, wherein the processing delay circuit includes;

a comparator which inputs the current to compares with a reference value and produces an output indicative of at least starting of the period, and a reference value supply circuit which varies the reference value to delay producing of the output of the comparator such that the starting of the period is delayed by the time.

6. A system according to claim 5, further including:

a comparator which inputs the ionization current to be compared with a reference value and produces the output indicative of the starting and ending of the period.

7. A system according to claim 5, wherein the comparator inputs the discharge current and produces the output indicative of the starting of the period.

8. A system according to claim 1, wherein the current detection circuit includes an integration capacitor to be charged by the ionization current, and the misfire detector detects the occurrence of misfire of the engine based on an output of the integration capacitor.

9. A system for detecting misfire for an internal combustion engine having an ignition plug, installed to face into a combustion chamber of a cylinder of the engine and connected to an ignition coil, which produces a discharge spark when supplied with discharge current from the ignition coil to ignite air-fuel mixture in the combustion chamber; comprising:

a current detection circuit which detects ionization current, that flows following the discharge current, during a period;

a misfire detector which detects occurrence of misfire of the engine based on the detected current; and a processing delay circuit which inputs the ionization current and based on the inputted ionization current, delays starting of the period by a time after the ionization current begins to flow.

10. A system according to claim 9, wherein the processing delay circuit includes;

a comparator which inputs the ionization current to compares with a reference value and produces an output indicative of the starting and ending of the period, and a capacitor provided before the comparator which delays inputting of the current to the comparator such that the starting of the period is delayed by the time.

11. A system according to claim 9, wherein the processing delay circuit includes;

a comparator which inputs the current to compares with a reference value and produces an output indicative of the starting and ending of the period, and a reference value supply circuit which varies the reference value to delay producing of the output of the comparator such that the starting of the period is delayed by the time.

12. A system according to claim 9, wherein the current detection circuit includes an integration capacitor to be charged by the ionization current, and the misfire detector detects the occurrence of misfire of the engine based on an output of the integration capacitor.

13. A system for detecting misfire for an internal combustion engine having an ignition plug, installed to face into a combustion chamber of a cylinder of the engine and connected to an ignition coil, which produces a discharge spark when supplied with discharge current from the ignition coil to ignite air-fuel mixture in the combustion chamber; comprising:

a current detection circuit which detects ionization current, that flows following the discharge current, during a period;

a misfire detector which detects occurrence of misfire of the engine based on the detected current; and a processing delay circuit which inputs the discharge current and based on the inputted current, delays starting of the period by a time after the discharge current cease to flow.

14. A system according to claim 13, wherein the processing delay circuit includes;

a comparator which inputs the discharge current to compares with a reference value and produces an output indicative of the starting of the period, and a capacitor provided before the comparator which delays inputting of the current to the comparator such that the starting of the period is delayed by the time.

15. A system according to claim 13, wherein the processing delay circuit includes;

a comparator which inputs the current to compares with a reference value and produces an output indicative of the starting of the period, and a reference value supply circuit which varies the reference value to delay producing of the output of the comparator such that the starting of the period is delayed by the time.

16. A system according to claim 13, wherein the current detection circuit includes an integration capacitor to be charged by the ionization current, and the misfire detector detects the occurrence of misfire of the engine based on an output of the integration capacitor.

17. A method of detecting misfire for an internal combustion engine having an ignition plug, installed to face into a combustion chamber of a cylinder of the engine and connected to an ignition coil, which produces spark discharge when supplied with discharge current from the ignition coil to ignite air-fuel mixture in the combustion chamber; comprising the steps of:

(a) detecting ionization current, that flows following the discharge current, during a period;

(b) detecting occurrence of misfire of the engine based on the detected current; and (c) inputting at least one of the discharge current and the ionization current and based on the inputted current, delaying starting of the period by a time point which is not earlier than termination of the discharge current.

18. A method according to claim 17, wherein the step (c) inputs the ionization current and delays the period by the time since the ionization current begins to flow.

19. A method according to claim 18, wherein the step (c) determines the period based on flow of the ionization current.

20. A method according to claim 17, wherein the step (c) inputs the discharge current and delays the period by a time since the discharge current terminates to flow.

* * * * *